United States Patent
Gee et al.

(10) Patent No.: US 9,524,434 B2
(45) Date of Patent: Dec. 20, 2016

(54) OBJECT TRACKING BASED ON DYNAMICALLY BUILT ENVIRONMENT MAP DATA

(71) Applicant: QUALCOMM Incorporated, San Diego, CA (US)

(72) Inventors: Andrew Philip Gee, Vienna (AT); Qi Pan, Vienna (AT); Michael Gervautz, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 14/494,947

(22) Filed: Sep. 24, 2014

(65) Prior Publication Data

US 2015/0098614 A1  Apr. 9, 2015

Related U.S. Application Data

(60) Provisional application No. 61/887,211, filed on Oct. 4, 2013.

(51) Int. Cl.
G06K 9/00 (2006.01)
G06T 19/00 (2011.01)

(52) U.S. Cl.
CPC ....... *G06K 9/00624* (2013.01); *G06K 9/00671* (2013.01); *G06T 19/006* (2013.01)

(58) Field of Classification Search
None
See application file for complete search history.

(56) References Cited

U.S. PATENT DOCUMENTS

| 8,638,986 B2 | 1/2014 | Jiang et al. |
| 8,649,565 B1 | 2/2014 | Kim et al. |
| 8,933,931 B2 * | 1/2015 | Balan .................... G06T 19/006 345/419 |
| 2011/0286631 A1 | 11/2011 | Wagner et al. |

(Continued)

FOREIGN PATENT DOCUMENTS

WO   WO-2012166814 A1   12/2012

OTHER PUBLICATIONS

Fioraio et al., "Joint detection, tracking and mapping by semantic bundle adjustment", CVPR 2013.*

(Continued)

*Primary Examiner* — Soo Jin Park
(74) *Attorney, Agent, or Firm* — Blakely Sokoloff Taylor & Zafman LLP (57) ABSTRACT

A computer-implemented method of tracking a target object in an object recognition system includes acquiring a plurality of images with a camera. The method further includes simultaneously tracking the target object and dynamically building environment map data from the plurality of images. The tracking of the target object includes attempting to estimate a target pose of the target object with respect to the camera based on at least one of the plurality of images and based on target map data. Next, the method determines whether the tracking of the target object with respect to the camera is successful. If not, then the method includes inferring the target pose with respect to the camera based on the dynamically built environment map data. In one aspect the method includes fusing the inferred target pose with the actual target pose even if tracking is successful to improve robustness.

30 Claims, 6 Drawing Sheets

(56) References Cited

U.S. PATENT DOCUMENTS

2013/0271625 A1    10/2013    Gruber et al.
2013/0322767 A1    12/2013    Chao et al.
2015/0098615 A1*    4/2015    Lee .................... G06K 9/00624
                                                        382/103

OTHER PUBLICATIONS

Tan et al., "Robust monocular SLAM in dynamic environments", ISMAR 2013.*
Zou et al., "CoSLAM: collaborative visual SLAM in dynamic environments", TPAMI 2013.*
Kim K., et al., "Keyframe-based modeling and tracking of multiple 3D objects," The International Society of Magnetic Resonance (ISMAR), 2010, pp. 193-198.
International Search Report and Written Opinion—PCT/US2014/057522—ISA/EPO—Jan. 5, 2015.
Klein G., et al., "Parallel Tracking and Mapping for Small AR Work spaces", Mixed and Augmented Reality, 2007. ISMAR 2007. 6th IEEE and ACM International Symposium on, 2007, pp. 1-10, XP058033260, DOI: 10.1109/ISMAR.2007.4538852 ISBN: 978-1-4244-1749-0 the whole document.
Vachetti L., et al., "Stable Real-Time 3D Tracking Using Online and Offline Information", IEEE Transactions on Pattern Analysis and Machine Intelligence, IEEE Computer Society, USA. vol. 26, No. 10, Oct. 1, 2004, pp. 1385-1391, XP011116546, ISSN: 0162-8828, DOI: 10.1109/TPAMI.2004.92 the whole document.

* cited by examiner

OBJECT TRACKING BASED ON DYNAMICALLY BUILT ENVIRONMENT MAP DATA

CROSS-REFERENCE TO RELATED APPLICATION

This application claims the benefit of U.S. Provisional Application No. 61/887,211, filed Oct. 4, 2013.

TECHNICAL FIELD

This disclosure relates generally to computer vision based object recognition applications, and in particular but not exclusively, relates to object tracking in an augmented reality system.

BACKGROUND INFORMATION

A challenge to enabling Augmented Reality (AR) on mobile phones or other mobile platforms is the problem of detecting and tracking objects in real-time. Object detection for AR applications has very demanding requirements: it must deliver full six degrees of freedom, give absolute measurements with respect to a given coordinate system, be very robust and run in real-time. Of interest are methods to compute camera pose using computer vision (CV) based approaches, which rely on first detecting and, subsequently, tracking objects within the camera view. In one aspect, the detection operation includes detecting a set of features contained within the digital image. A feature may refer to a region in the digital image that differs in properties, such as brightness or color, compared to areas surrounding that region. In one aspect, a feature is a region of a digital image in which some properties are constant or vary within a prescribed range of values.

The detected features are then compared to known features contained in a feature database in order to determine whether a real-world object is present in the image. Thus, an important element in the operation of a vision-based AR system is the composition of the feature database. In some systems, the feature database is built pre-runtime by taking multiple sample images of known target objects from a variety of known viewpoints. Features are then extracted from these sample images and added to the feature database.

Recently, augmented reality systems have turned to model-based tracking algorithms or Simultaneous Localization And Mapping (SLAM) algorithms that are based on color or grayscale image data captured by a camera. SLAM algorithms reconstruct three-dimensional (3D) points from incoming image sequences captured by a camera and are used to build a 3D map of a scene (i.e., a SLAM map) in real-time. From the reconstructed map, it is possible to localize a camera's 6 DoF (Degree of Freedom) pose in a current image frame.

In some systems SLAM maps of a target object are generated pre-runtime and in close distance from the object. In runtime, the generated SLAM maps of the object are used to estimate 6 DoF pose of the camera, relative to the object, from incoming video frames.

In existing methods, tracking performance depends upon the appearance of the object and its size in the camera view. If the target object is small, partially occluded, or lacks distinctive visual features, then the estimated camera pose loses accuracy and can also exhibit significant tracking jitter. In more extreme circumstances, very distant objects and objects that lie outside of the current field of view cannot be tracked at all, so any virtual augmentations registered with the target will also be lost.

BRIEF SUMMARY

Some embodiments discussed herein provide for improved tracking robustness of any trackable object and may extend the range of trackable poses beyond the visible range of the target. Embodiments discussed herein may be applied to any augmented reality (AR) system that is based on tracking a reference target. In one aspect, a tracking system estimates the target pose in the camera frames based on target map data, while in parallel, a pose calculator determines an estimate of the target pose based on a dynamically generated 3D representation of the environment surrounding the target (i.e., environment map data). If tracking fails based on the target map data, the estimated target pose generated by the pose calculator may be used.

For example, a simultaneous localization and mapping (SLAM) system may build a 3D representation of the environment surrounding the target (which may optionally also include the target itself) as the camera is move about the environment. Next, the environment pose is estimated based on the SLAM map data. The target pose and environment pose in the camera frames together provide an estimate of the target pose in the environment, which can be refined as more observations are recorded. If tracking of the target fails, e.g. when the target goes out of view or becomes small, the estimate of the target pose in the environment is then used to infer the target pose from the tracked environment pose. In one embodiment, if tracking of the target becomes unstable, e.g., jitter due to small size or low accuracy due to poor coverage of features in the image, the inferred target pose and actual target pose are fused to improve robustness.

The above and other aspects, objects, and features of the present disclosure will become apparent from the following description of various embodiments, given in conjunction with the accompanying drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Reference throughout this specification to "one embodiment", "an embodiment", "one example", or "an example" means that a particular feature, structure, or characteristic described in connection with the embodiment or example is included in at least one embodiment of the present invention. Thus, the appearances of the phrases "in one embodiment"

or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

In one aspect, using environment map data in the tracking of a target object improves tracking robustness of any trackable object and extends the range of trackable poses beyond the visible range of the target and can even increase the tracking performance of an object that is moving with respect to the environment.

In one embodiment, environment map data includes map features and keyframe images, where each feature includes a keypoint location and at least one corresponding descriptors of that location. Map features may include features extracted from the scene (e.g, 2D/3D points, edges, blobs, etc). Keyframe images may include images of the scene, from which the map features are extracted. For example, 3D points can be reconstructed by triangulation among keyframes where the point is visible. Descriptors of map features are extracted from keyframes where the map point is observed (e.g., image patch descriptors and line descriptors).

In one example, target map data of a target object is generated offline and may thus be referred to as "offline map data", whose keyframes are generated typically from a close-distance to the object. The offline map data is considered as 'good' enough to perform detection and tracking of the target. When a user starts interactions with a target object, its offline map data is loaded to an augmented reality application and the target object is detected and tracked from the camera images.

Figure 1A:
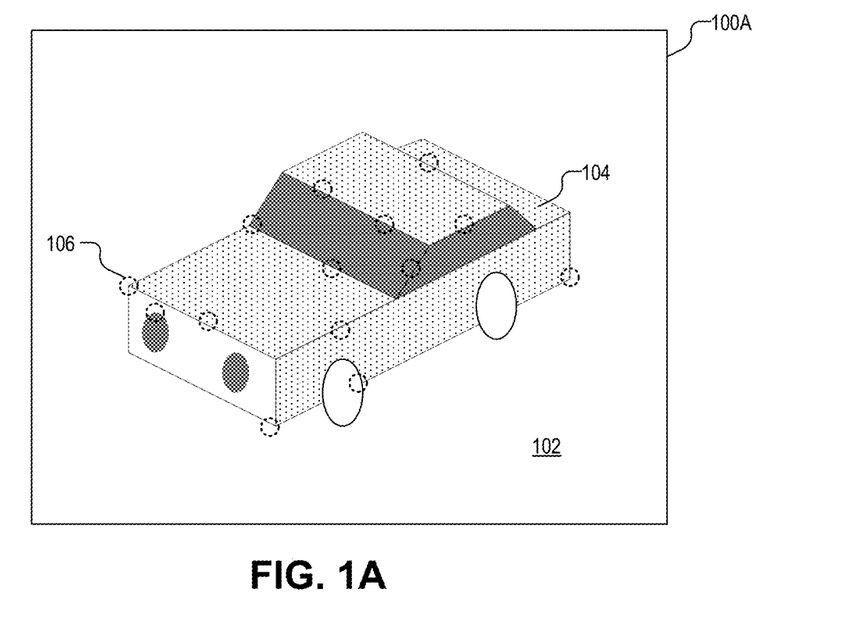
FIGS. 1A and 1B illustrate images of a scene including a target object at differing distances.
Figure 1B:
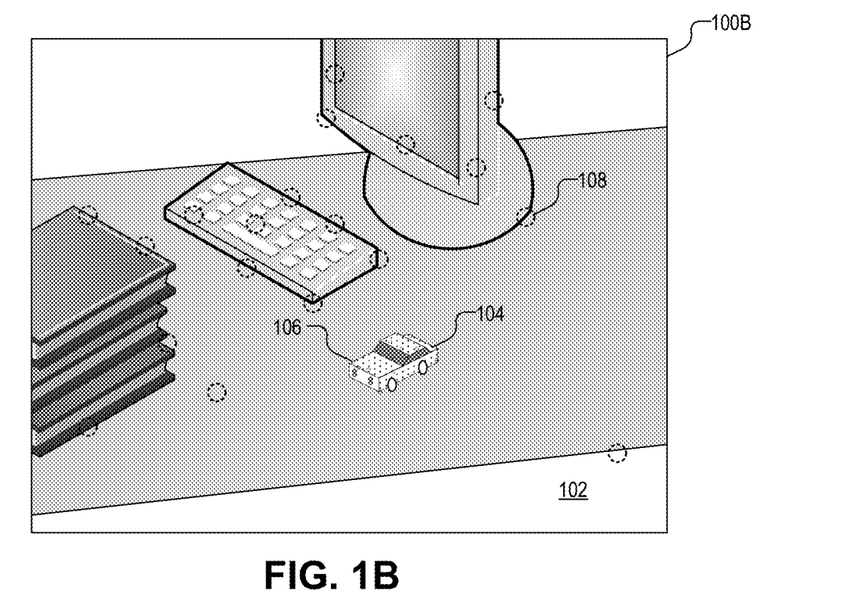

Once the target object is detected from camera video frames, it is tracked and the camera's 6 DoF pose is obtained in real-time. FIG. 1A illustrates an acquired image 100A of a scene 102 including a target object 104 at a close distance including features 106. Thus, target object 104 assumes a large portion of the camera image 100A and tracking will typically work fine. However, as the camera moves away from the target object 104 as depicted in FIG. 1B, the scale of the target 104 in image 100B becomes small soon. As the object scale becomes small in camera images, or even is outside of the image, tracking is likely to fail.

Accordingly, embodiments disclosed herein overcome this limitation in tracking, by using environment map data of the scene that are dynamically acquired while a user moves the camera around the object. As keyframes of the environment are added to the environment map data, tracking becomes robust and stable. In one embodiment the environment map data may be referred to as "online map data."

When a user moves the camera around the object and its environment, new keyframes are added to the environment map data. Conventional SLAM frameworks add a keyframe by comparing the pose of a candidate keyframe (i.e., current camera image) with those of existing keyframes. If the pose of a candidate keyframe is similar to one of existing keyframes' it is ignored. In this way, a conventional SLAM framework avoids creating too many duplicated keyframes, which have close viewpoints. However, this conventional scheme prevents adding online keyframes and makes it difficult to extend the offline map quickly.

Figure 2:
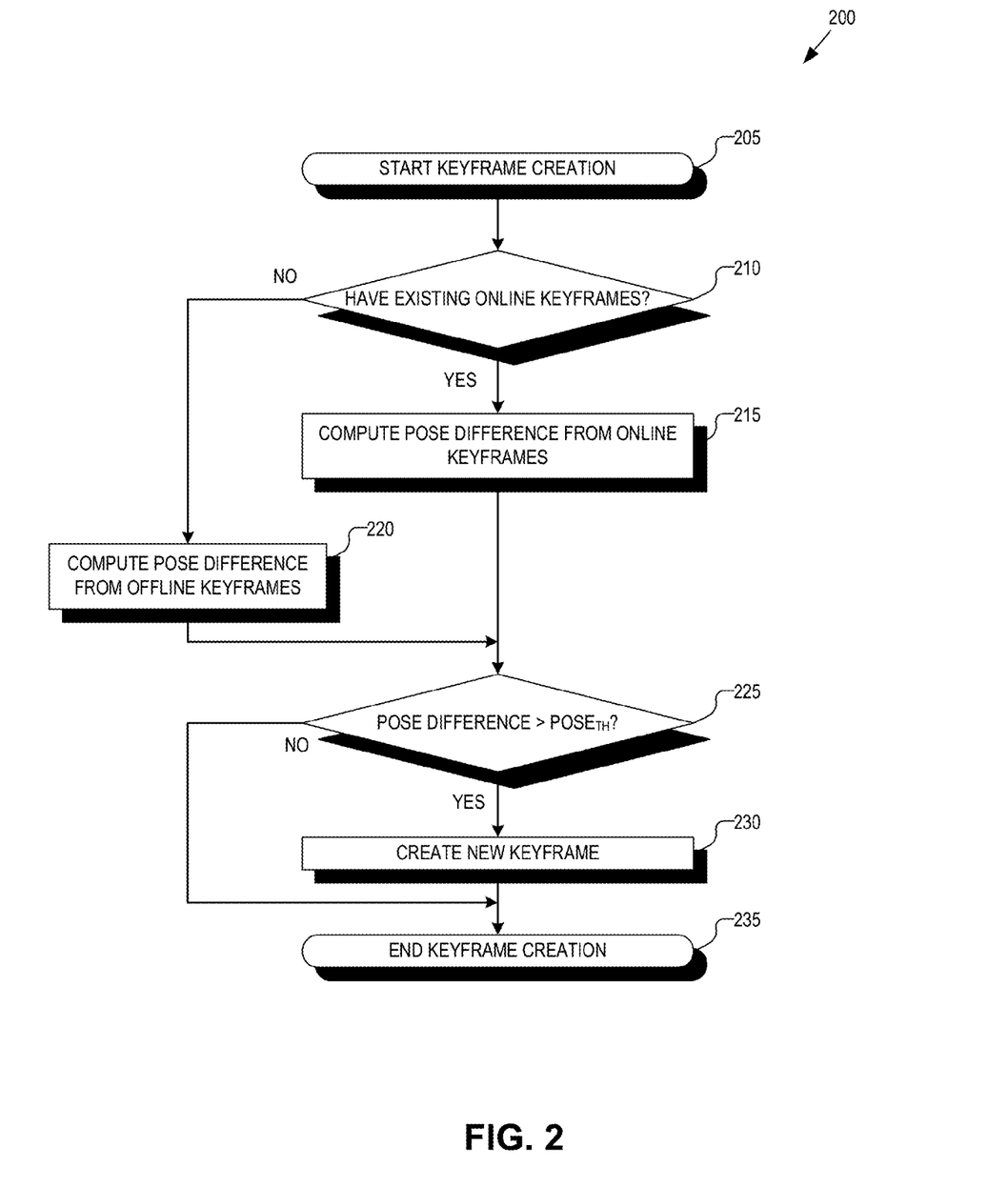
FIG. 2 is a flowchart illustrating a process of building environment map data.

Accordingly, embodiments of the present disclosure address this problem by skipping the offline keyframes in pose comparison step when adding online keyframes. Only online keyframes are considered in this pose comparison when generating environment map data. If the first online keyframe is about to be added, there is no online keyframes to compare with. In this case, pose differences from all offline keyframes are computed and the maximum is used as a pose difference measurement. In one embodiment, many of the offline keyframes are discarded after creation and only a map of 3D points and descriptors are kept. Thus, in this example, the online map data is built without any offline keyframes and as such, the first online keyframe would be automatically accepted and added to the environment map. FIG. 2 is a flowchart illustrating an example process 200 of building online map data.

Keyframe creation begins in process block 205. If there are no existing online keyframes included in the environment map data then process 200 proceeds to process block 220 where a pose difference is computed using the offline keyframes. If, however, in decision block 210 it is determined that there are indeed existing online keyframes, then process block 215 includes computing the pose difference (e.g., pose difference) from only the online keyframes. In decision block 225, the calculated pose difference is compared against a pose threshold $POSE_{TH}$ to determine whether the pose difference is large enough. If so, a new keyframe is created in the environment map data (i.e., process block 230). If the pose difference is not large enough, process 200 proceeds to process block 235 where keyframe creation is ended. Process 200 may be repeated for one or more of the captured images as the camera is moved about a scene.

When a new keyframe is added to the existing environment map data, the coordinates of all map features and 6 DoF poses of all keyframes are updated in a SLAM framework to globally optimize the map data. Thus, when a keyframe is added, the map features on the object surface are changed slightly depending on the optimization results. This strategy is useful to improve the map's quality in a global manner. However, modifying offline map data is not desirable in current embodiments, because it may degrade the quality of detection and tracking of a target in a close distance. To prevent this, embodiments disclosed herein set the offline map data as 'constant' and do not update the offline map data in process 200.

Figure 3:
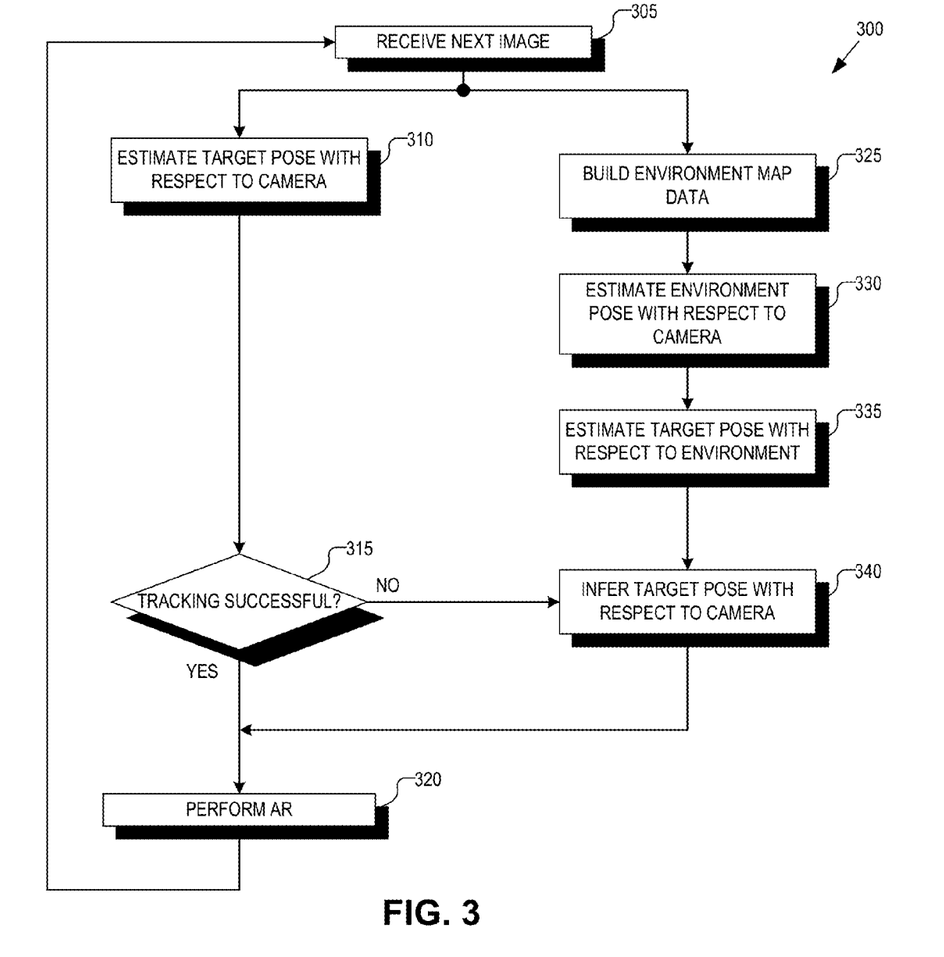
FIG. 3 is a flowchart illustrating a process of tracking a target object in a scene.

FIG. 3 is a flowchart illustrating a process 300 of tracking a target object in a scene. Process 300 begins at process block 305 where a target object has already been detected and tracking is being implemented. Thus, a next image is received in process block 305. Next, in process block 310, an object tracker (e.g., tracking algorithm) may attempt to track the detected object and to provide an estimated pose of the target with respect to the camera. If tracking is successful, then the object tracker passes this estimated target pose to an AR engine, which may perform other jobs such as augmented reality (i.e., process block 345).

Executed in parallel to process block 310, process 300 includes process blocks 325-335 which include calculating an estimated pose of the target with respect to the environment. For example, in process block 325 environment map data of the environment is built based on the received images by applying the aforementioned SLAM techniques. Process 200 of FIG. 2 is one possible implementation of process block 325. In process block 330 the environment map data is then used to estimate a pose of the environment with respect to the camera. The estimated target pose of process block 310 and the estimated environment pose of process block 330 are then used together, in process block 335, to provide an estimate of the target pose in the environment, which can be refined as more images are received. In one example, refinement may include handling cases where the target has been moved with respect to the environment (e.g., as with moving targets, etc.).

If, in decision block 315, the tracking was not successful, then process 300 proceeds to process block 340 where a pose of the target with respect to the camera is inferred based on the estimated target pose of process block 335. The inferred target pose is then passed on to the AR engine in process block 345.

In some embodiments, if tracking of the target becomes unstable, e.g., jitter due to small size or low accuracy due to poor coverage of features in the image, the inferred target pose and actual target pose may be fused to improve robustness. Fusing of the inferred target pose and actual target pose may include applying a filter, such as the Kalman filter.

Figure 4:
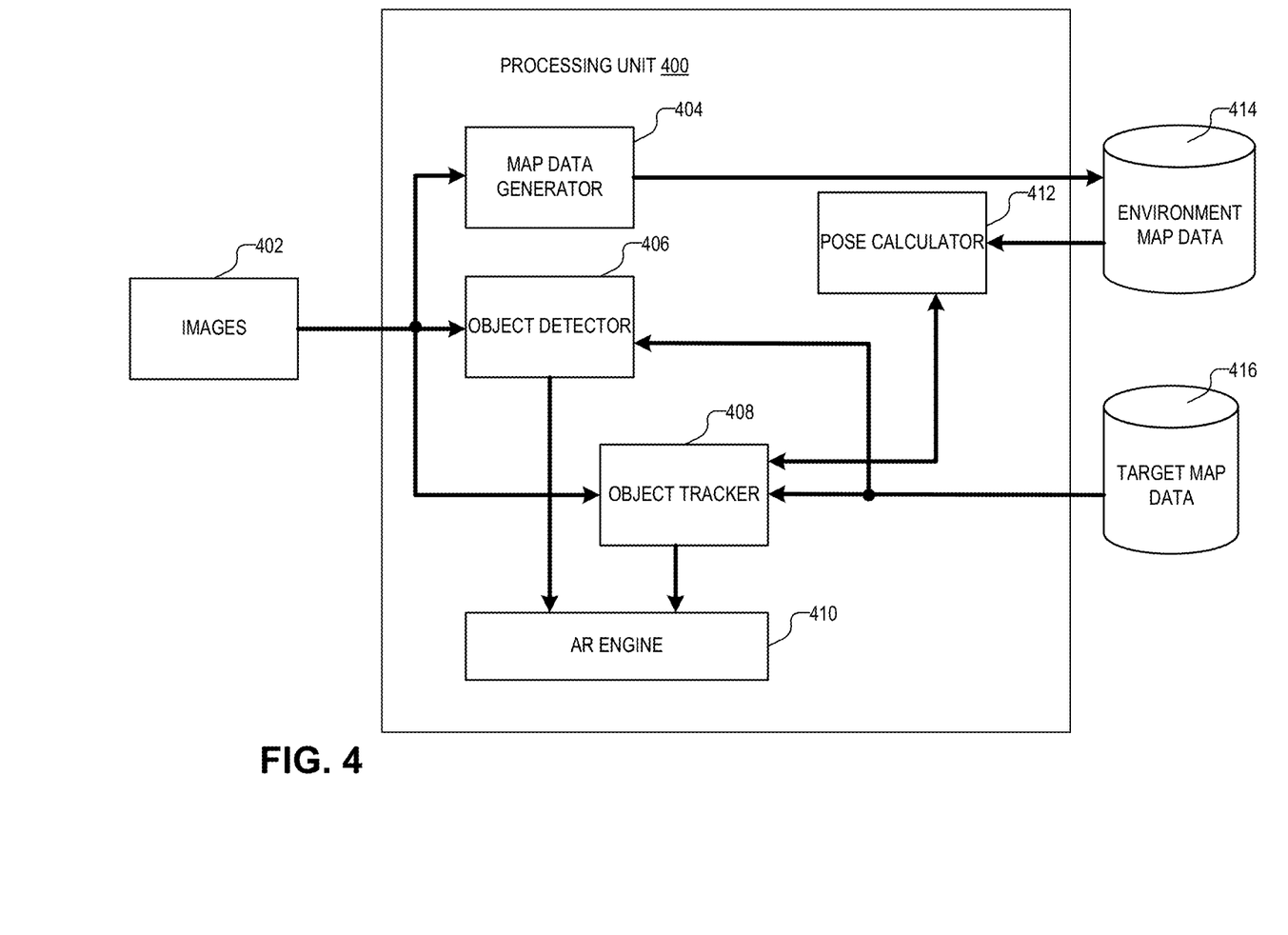
FIG. 4 is a functional block diagram of a processing unit for object detecting and tracking.

FIG. 4 is a functional block diagram of a processing unit 400 for object detection and tracking. In one embodiment, processing unit 400, under direction of program code, may perform processes 200 and/or 300, discussed above. For example, a temporal sequence of images 402 are received by the processing unit 400. Object detector 406 detects a target object included in at least one of the images and object tracker 408 tracks the object based on the sequence of images 402. As the images are acquired, map data generator 404 may add select keyframes to the environment map data 414 (e.g., see process 200).

Object detector 406 may determine the current pose of a camera relative to a target object based on the received images and based on the target map data 416. As discussed above, as object tracker 408 tracks the target object, pose calculator 412 may be, in parallel, generating an estimate of the target pose with respect to the environment. If tracking of the target object is lost, then object tracker 408 may infer the target pose with respect to the camera based on the target pose generated by the pose calculator 412.

Augmented Reality (AR) engine 410 may perform any operations related to augmented reality based on the camera pose determined by object detector 406 and/or object tracker 408.

Figure 5:
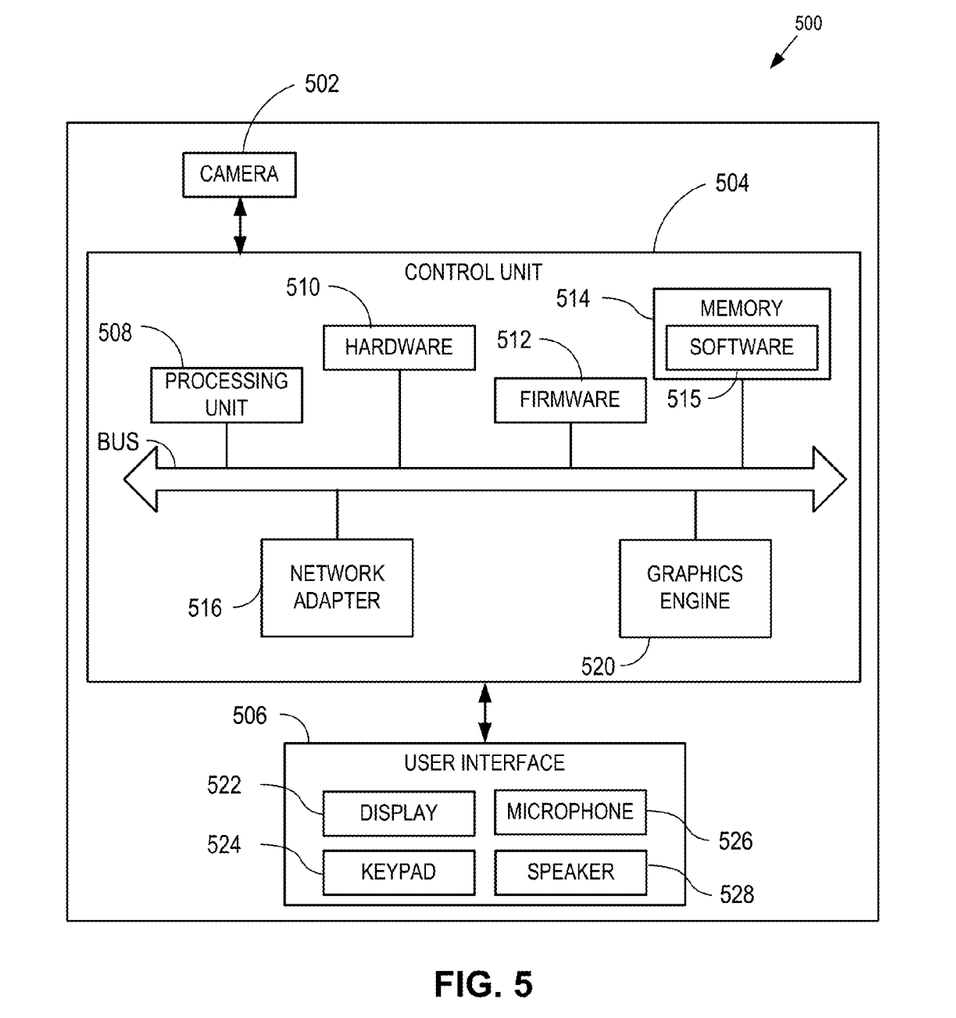
FIG. 5 is a functional block diagram of a mobile platform capable of performing the processes discussed herein.

FIG. 5 is a functional block diagram of a mobile platform 500 capable of performing the processes discussed herein. As used herein, a mobile platform refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. In addition a "mobile platform" may also include all electronic devices which are capable of augmented reality (AR), virtual reality (VR), and/or mixed reality (MR) applications. Any operable combination of the above are also considered a "mobile platform."

Mobile platform 500 may optionally include a camera 502 as well as an optional user interface 506 that includes the display 522 capable of displaying images captured by the camera 502. User interface 506 may also include a keypad 524 or other input device through which the user can input information into the mobile platform 500. If desired, the keypad 524 may be obviated by integrating a virtual keypad into the display 522 with a touch sensor. User interface 506 may also include a microphone 526 and speaker 528.

Mobile platform 500 also includes a control unit 504 that is connected to and communicates with the camera 502 and user interface 506, if present. The control unit 504 accepts and processes images received from the camera 502 and/or from network adapter 516. Control unit 504 may be provided by a processing unit 508 and associated memory 514, hardware 510, software 515, and firmware 512.

Processing unit 400 of FIG. 4 is one possible implementation of processing unit 508 for object detection and tracking, as discussed above. Control unit 504 may further include a graphics engine 520, which may be, e.g., a gaming engine, to render desired data in the display 522, if desired. Processing unit 508 and graphics engine 520 are illustrated separately for clarity, but may be a single unit and/or implemented in the processing unit 508 based on instructions in the software 515 which is run in the processing unit 508. Processing unit 508, as well as the graphics engine 520 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware. Moreover, as used herein the term "memory" refers to any type of computer storage medium, including long term, short term, or other memory associated with mobile platform 500, and is not to be limited to any particular type of memory or number of memories, or type of media upon which memory is stored.

The processes described herein may be implemented by various means depending upon the application. For example, these processes may be implemented in hardware 510, firmware 512, software 515, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 515 and executed by the processing unit 508. Memory may be implemented within or external to the processing unit 508.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
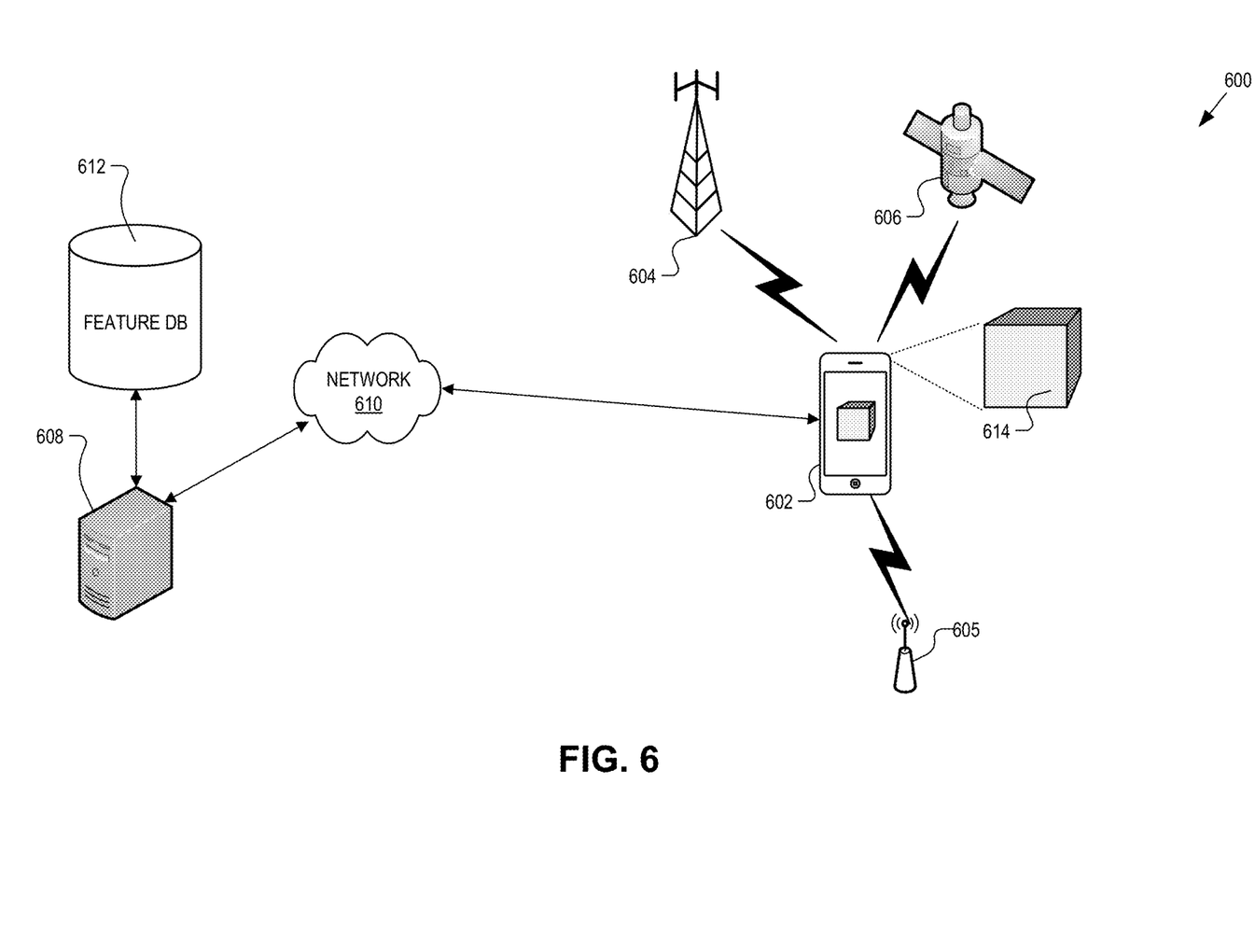
FIG. 6 is a functional block diagram of an object recognition system.

FIG. 6 is a functional block diagram of an object recognition system 600. As shown, object recognition system 600 includes an example mobile platform 602 that includes a camera (not shown in current view) capable of capturing images of a scene including object 614. Feature database 612 may include any of the aforementioned map data, including environment (online) and target (offline) map data.

The mobile platform 602 may include a display to show images captured by the camera. The mobile platform 602 may also be used for navigation based on, e.g., determining its latitude and longitude using signals from a satellite positioning system (SPS), which includes satellite vehicle(s) 606, or any other appropriate source for determining position including cellular tower(s) 604 or wireless communication access points 705. The mobile platform 602 may also include orientation sensors, such as a digital compass, accelerometers or gyroscopes, that can be used to determine the orientation of the mobile platform 602.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 606. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile platform 602 is not limited to use with an SPS for position determination, as position determination techniques may be implemented in conjunction with various wireless communication networks, including cellular towers 604 and from wireless communication access points 605, such as a wireless wide area network (WWAN), a wireless local area network (WLAN), a wireless personal area network (WPAN). Further the mobile platform 602 may access one or more servers 608 to obtain data, such as online and/or offline map data from a database 612, using various wireless communication networks via cellular towers 604 and from wireless communication access points 605, or using satellite vehicles 606 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As shown in FIG. 6, system 600 includes mobile platform 602 capturing an image of object 614 to be detected and tracked based on the map data included in feature database 612. As illustrated, the mobile platform 602 may access a network 610, such as a wireless wide area network (WWAN), e.g., via cellular tower 604 or wireless communication access point 605, which is coupled to a server 608, which is connected to database 612 that stores information related to target objects and their images. While FIG. 6 shows one server 608, it should be understood that multiple servers may be used, as well as multiple databases 612. Mobile platform 602 may perform the object detection and tracking itself, as illustrated in FIG. 6, by obtaining at least a portion of the database 612 from server 608 and storing the downloaded map data in a local database inside the mobile platform 602. The portion of a database obtained from server 608 may be based on the mobile platform's geographic location as determined by the mobile platform's positioning system. Moreover, the portion of the database obtained from server 608 may depend upon the particular application that requires the database on the mobile platform 602. The mobile platform 602 may extract features from a captured query image, and match the query features to features that are stored in the local database. The query image may be an image in the preview frame from the camera or an image captured by the camera, or a frame extracted from a video sequence. The object detection may be based, at least in part, on determined confidence levels for each query feature, which can then be used in outlier removal. By downloading a small portion of the database 612 based on the mobile platform's geographic location and performing the object detection on the mobile platform 602, network latency issues may be avoided and the over the air (OTA) bandwidth usage is reduced along with memory requirements on the client (i.e., mobile platform) side. If desired, however, the object detection and tracking may be performed by the server 608 (or other server), where either the query image itself or the extracted features from the query image are provided to the server 608 by the mobile platform 602. In one embodiment, online map data is stored locally by mobile platform 602, while offline map data is stored in the cloud in database 612.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various modifications to the embodiments disclosed herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method of tracking a target object in an object recognition system, the method comprising:
   acquiring a plurality of images with a camera;
   simultaneously tracking the target object and dynamically building environment map data from the plurality of images, wherein tracking the target object includes attempting to estimate a target pose of the target object with respect to the camera based on at least one of the plurality of images and based on target map data;
   determining whether the tracking of the target object with respect to the camera is successful; and, if not, then inferring the target pose with respect to the camera based on the environment map data.

2. The computer-implemented method of claim 1, further comprising:

inferring the target pose with respect to the camera based on the environment map data if it is determined that tracking of the target object with respect to the camera is successful; and
   fusing the estimated target pose with the inferred target pose.

3. The computer-implemented method of claim 2, wherein fusing the estimated target pose with the inferred target pose includes applying a Kalman filter.

4. The computer-implemented method of claim 1, wherein inferring the target pose with respect to the camera based on the environment map data includes:
   estimating an environment pose of the environment with respect to the camera;
   estimating a target pose of the target object with respect to the environment; and
   inferring the target pose with respect to the camera based on the estimated target pose with respect to the environment.

5. The computer-implemented method of claim 1, wherein the environment map data is based one or more keyframes corresponding with the one or more plurality of images acquired with the camera.

6. The computer-implemented method of claim 5, wherein building the environment map data includes keyframe Simultaneous Localization and Mapping (SLAM).

7. The computer-implemented method of claim 5, wherein building the environment map data includes adding a candidate keyframe to the one or more keyframes by computing a pose difference between the candidate keyframe and other online keyframes corresponding to images acquired by the camera.

8. The computer-implemented method of claim 7, wherein computing the pose difference between the candidate keyframe and other online keyframes includes skipping offline keyframes when computing the pose difference.

9. The computer-implemented method of claim 7, wherein the pose difference is a minimum pose difference between the candidate keyframe and other online keyframes, the method further comprising adding the candidate keyframe to the other online keyframes if the pose difference is more than a pose threshold.

10. A non-transitory computer-readable medium including program code stored thereon for tracking a target object in an object recognition system, the program code comprising instructions to:
    acquire a plurality of images with a camera;
    simultaneously track the target object and dynamically build environment map data from the plurality of images, wherein the instructions to track the target object includes instructions to attempt to estimate a target pose of the target object with respect to the camera based on at least one of the plurality of images and based on target map data;
    determine if tracking of the target object with respect to the camera is successful; and, if not, then
    infer the target pose with respect to the camera based on the environment map data.

11. The non-transitory computer-readable medium of claim 10, wherein the instructions to infer the target pose with respect to the camera based on the environment map data includes instructions to:
    estimate an environment pose of the environment with respect to the camera;
    estimate a target pose of the target object with respect to the environment; and infer the target pose with respect to the camera based on the estimated target pose with respect to the environment.

12. The non-transitory computer-readable medium of claim 10, wherein the environment map data is based one or more keyframes corresponding with the one or more plurality of images acquired with the camera.

13. The non-transitory computer-readable medium of claim 12, wherein the instructions to build the environment map data includes keyframe Simultaneous Localization and Mapping (SLAM).

14. The non-transitory computer-readable medium of claim 12, wherein the instructions to build the environment map data includes instructions to add a candidate keyframe to the one or more keyframes and to compute a pose difference between the candidate keyframe and other online keyframes corresponding to images acquired by the camera.

15. The non-transitory computer-readable medium of claim 14, wherein the instructions to compute the pose difference between the candidate keyframe and other online keyframes includes instructions to skip offline keyframes when computing the pose difference.

16. The non-transitory computer-readable medium of claim 14, wherein the pose difference is a minimum pose difference between the candidate keyframe and other online keyframes, the medium further instructions to add the candidate keyframe to the other online keyframes if the pose difference is more than a pose threshold.

17. An apparatus, comprising:
memory adapted to store program code for tracking a target object in an object recognition system;
a processing unit adapted to access and execute instructions included in the program code, wherein when the instructions are executed by the processing unit, the processing unit directs the apparatus to:
acquire a plurality of images with a camera;
simultaneously track the target object and dynamically build environment map data from the plurality of images, wherein the instructions to track the target object includes instructions to attempt to estimate a target pose of the target object with respect to the camera based on at least one of the plurality of images and based on target map data;
determine if tracking of the target object with respect to the camera is successful; and, if not, then
infer the target pose with respect to the camera based on the environment map data.

18. The apparatus of claim 17, wherein the instructions to infer the target pose with respect to the camera based on the environment map data includes instructions to:
estimate an environment pose of the environment with respect to the camera;
estimate a target pose of the target object with respect to the environment; and
infer the target pose with respect to the camera based on the estimated target pose with respect to the environment.

19. The apparatus of claim 17, wherein the environment map data is based one or more keyframes corresponding with the one or more plurality of images acquired with the camera.

20. The apparatus of claim 19, wherein the instructions to build the environment map data includes keyframe Simultaneous Localization and Mapping (SLAM).

21. The apparatus of claim 19, wherein the instructions to build the environment map data includes instructions to add a candidate keyframe to the one or more keyframes and to compute a pose difference between the candidate keyframe and other online keyframes corresponding to images acquired by the camera.

22. The apparatus of claim 21, wherein the instructions to compute the pose difference between the candidate keyframe and other online keyframes includes instructions to skip offline keyframes when computing the pose difference.

23. The apparatus of claim 21, wherein the pose difference is a minimum pose difference between the candidate keyframe and other online keyframes, the medium further instructions to add the candidate keyframe to the other online keyframes if the pose difference is more than a pose threshold.

24. The apparatus of claim 17, further comprising the camera to acquire the plurality of images.

25. An apparatus, comprising:
means for acquiring a plurality of images with a camera;
means for simultaneously tracking the target object and dynamically building environment map data from the plurality of images, wherein the means for tracking the target object includes means for attempting to estimate a target pose of the target object with respect to the camera based on at least one of the plurality of images and based on target map data;
means for determining whether the tracking of the target object with respect to the camera is successful; and
means for inferring the target pose with respect to the camera based on the environment map data if the tracking of the target object with respect to the camera is unsuccessful.

26. The apparatus of claim 25, further comprising:
means for inferring the target pose with respect to the camera based on the environment map data if it is determined that tracking of the target object with respect to the camera is successful; and
means for fusing the estimated target pose with the inferred target pose.

27. The apparatus of claim 25, wherein the means for inferring the target pose with respect to the camera based on the environment map data includes:
means for estimating an environment pose of the environment with respect to the camera;
means for estimating a target pose of the target object with respect to the environment; and
means for inferring the target pose with respect to the camera based on the estimated target pose with respect to the environment.

28. The apparatus of claim 25, wherein the environment map data is based one or more keyframes corresponding with the one or more plurality of images acquired with the camera, and wherein the means for building the environment map data includes keyframe Simultaneous Localization and Mapping (SLAM).

29. The apparatus of claim 25, wherein the environment map data is based one or more keyframes corresponding with the one or more plurality of images acquired with the camera, and wherein the means for building the environment map data includes means for adding a candidate keyframe to the one or more keyframes by computing a pose difference between the candidate keyframe and other online keyframes corresponding to images acquired by the camera.

30. The apparatus of claim 29, wherein the pose difference is a minimum pose difference between the candidate keyframe and other online keyframes, the apparatus further comprising means for adding the candidate keyframe to the other online keyframes if the pose difference is more than a pose threshold.

* * * * *